June 27, 1950  J. T. DUARTE  2,513,011
HEAT DISTRIBUTING PLATE AND DRIP PAN
Filed Dec. 26, 1947
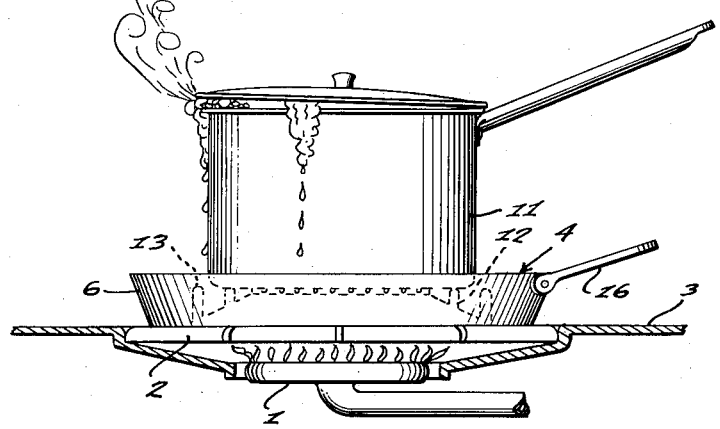
*Fig. 1*
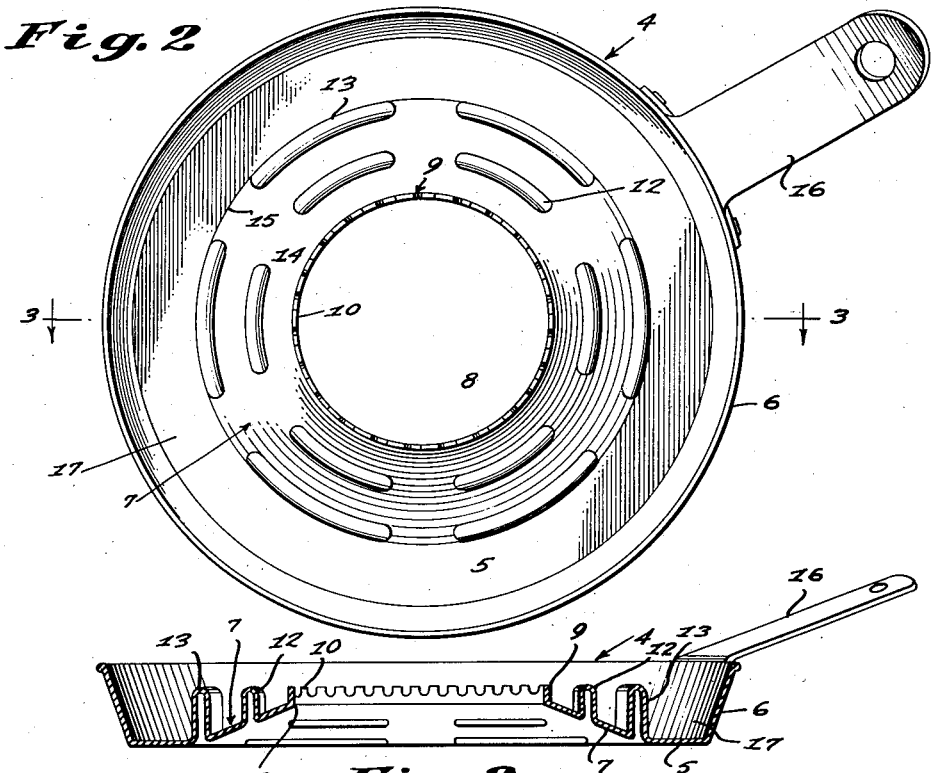
*Fig. 2*
*Fig. 3*
INVENTOR.
JOHN T. DUARTE
BY
McMorrow, Berman & Davidson
ATTORNEYS Patented June 27, 1950

2,513,011

UNITED STATES PATENT OFFICE 2,513,011

HEAT DISTRIBUTING PLATE AND DRIP PAN

John Thomas Duarte, Honolulu, Territory of Hawaii

Application December 26, 1947, Serial No. 793,958

2 Claims. (Cl. 126—215)

The present invention is directed to improvements in a device designed to protect the burners of gas stoves.

The primary object of the invention is to provide a device of this character adapted to be placed over a gas burner and when so positioned any overflow of liquid from the utensil will be trapped and prevented from reaching the burner.

Another object of the invention is to so provide a device of this nature constructed in such manner that when in place over a burner the heat therefrom will be in no way retarded.

Still another object of the invention is to provide a device of this kind which is extremely simple in construction, efficient in operation and can be manufactured at a minimum cost.

With these and other objects in view, this invention resides in the novel features of construction, formation, combination and arrangement of parts to be hereinafter more fully described, claimed and illustrated in the accompanying drawing, in which:

Figure 1 is a side elevation, partly in section.

Figure 2 is a top plan view of the device.

Figure 3 is a sectional view of the device taken on line 3—3 of Figure 2.

Referring to the drawing, 1 designates a conventional gas burner supported as usual under the grid 2 by the stove top 3.

The protector 4 is formed from suitable metal, stamped or cast, is circular in contour, and includes a main bottom 5 which terminates at its outer edge in an upwardly inclined wall 6.

The inner edge of the bottom 5 terminates in an upwardly inclined body 7 having a central opening 8 formed therein, there being a vertically disposed annular rim 9 surrounding the opening 8.

This rim has formed therein a plurality of equally spaced heat-conducting passages 10, and it is upon this rim that the cooking utensil 11 rests when the device is in use.

The body 7 has formed therein two rows of circularly aligned heat-trapping ribs 12 and 13, arranged in groups of two and spaced equal distances apart to provide aligned passages 14 and 15, the purpose of which will later appear. The upper ends of the ribs 12 and 13 are disposed in the same plane as the upper edge of the rim 9, below the upper edge of the outer wall 6.

In order that the device can be conveniently placed on or removed from the stove the handle 16 is secured to the wall 6.

As shown in Figure 1, the utensil 11 is supported by the rim 9 and innermost group of ribs 12, but it will be of course understood that if the diameter of the vessel is slightly greater than the width of the opening 8 the vessel will be wholly supported by the rim 9. Likewise, if the diameter of the vessel is greater than the distances between the ribs 12 and 13 any overflow will enter the trough 17. The ribs 12 and 13 are formed as concentric segments of circles about the opening 8.

Assuming the vessel is in the position as shown in Figure 1, the overflow therefrom will flow onto the body 7 and pass through the radial passages 15 into the trough 17, but if the diameter of the vessel is such that it is supported solely by the rim 9 the overflow will pass through the passages 14 and 15 and thence into the trough 17.

From the foregoing, it will be seen that the device is so constructed as to positively prevent the fluid which might drip or flow from the utensil from reaching the stove top or burner.

It will be further noted that the structure is such that the heat from the burner will be concentrated upon the bottom of a utensil, and that the device can also be used on stoves equipped with electrical heating units.

What is claimed is:

1. A heat distributing plate and drip pan comprising an annular bottom, an inwardly and upwardly inclined body rising from the inner edge of said bottom, said body having a central opening, an upwardly extending annular rim on the edge of said opening and formed with circumferentially spaced apart heat conducting passages therein, a plurality of groups of radially spaced apart downwardly opening hollow ribs on said body, said ribs of each group being concentric to said bottom and to the opening and arranged in spaced circumferentially aligned segments defining radially extending, downwardly and outwardly inclined, passages, and an outer wall about the outer edge of said bottom.

2. A heat distributing plate and drip pan comprising an annular bottom, an inwardly and upwardly inclined body rising from the inner edge of said bottom, said body having a central opening, an upwardly extending annular rim on the edge of said opening and formed with circumferentially spaced apart heat conducting passages therein, a plurality of groups of radially spaced apart downwardly opening hollow ribs on said body, said ribs of each group being concentric to said bottom and to the opening and arranged in spaced circumferentially aligned segments defining radially extending, downwardly and outwardly inclined, passages, and an outer wall about the outer edge of said bottom, the upper edge of said ribs being disposed in planar alignment with the upper edge of said rim.

JOHN THOMAS DUARTE.

REFERENCES CITED

The following references are of record in the file of this patent:

UNITED STATES PATENTS

| Number | Name | Date |
| --- | --- | --- |
| 923,690 | Newsam | June 1, 1909 |
| 1,509,445 | Schwartz | Sept. 23, 1924 |
| 1,683,977 | Keiner | Sept. 11, 1928 |
| 1,810,132 | Detwiler | June 16, 1931 |
| 1,968,786 | Schultz | July 31, 1934 |